Jan. 14, 1936.  A. L. KURZ  2,027,596
FOOD PRODUCT AND METHOD OF MAKING THE SAME
Original Filed May 5, 1933
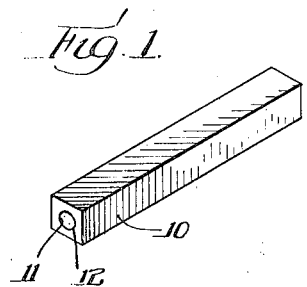
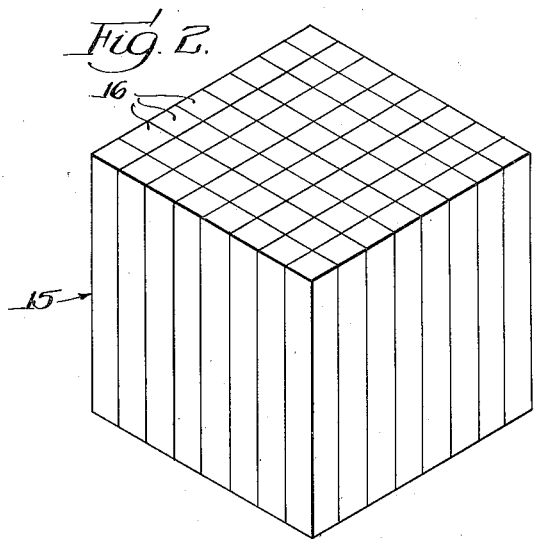
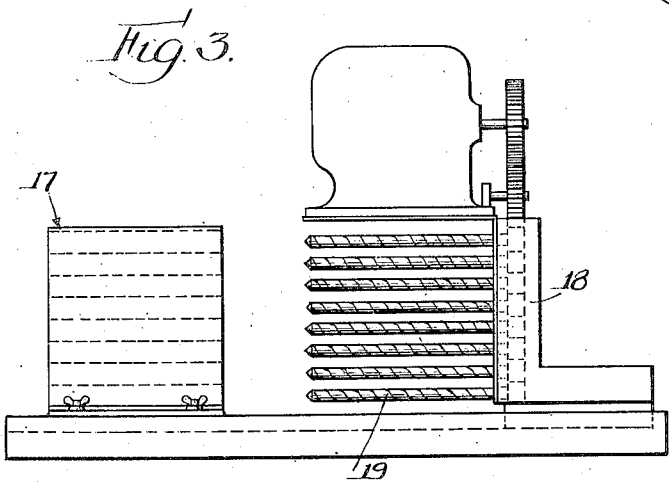
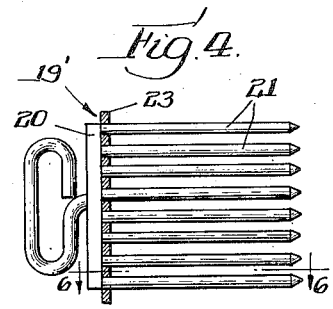
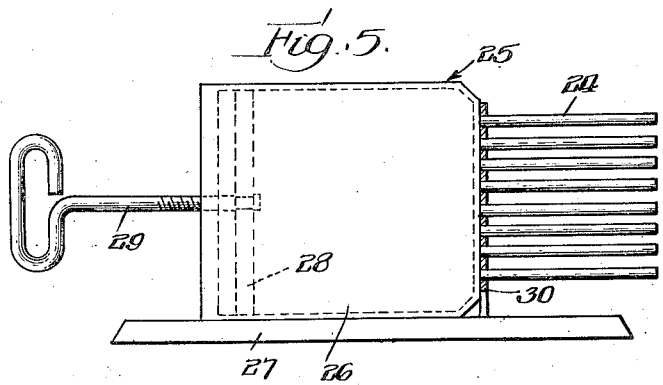
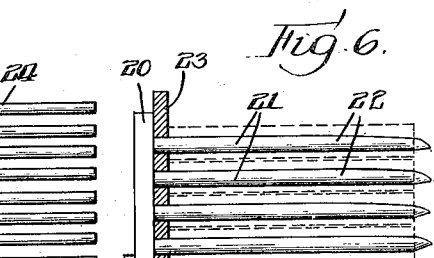
Inventor
Arthur L. Kurz Patented Jan. 14, 1936

2,027,596

UNITED STATES PATENT OFFICE 2,027,596

FOOD PRODUCT AND METHOD OF MAKING THE SAME

Arthur L. Kurz, Chicago, Ill.

Application May 5, 1933, Serial No. 669,536
Renewed June 1, 1935

9 Claims. (Cl. 99—11)

The invention relates generally to food products and more particularly to such products having an outer shell surrounding a filling of a different food substance.

An important object of the present invention is to provide such a food product wherein a shell formed from a relatively solid food, having physical properties generally similar to an apple or a potato, is combined with and flavored by a filling of a plastic food such as sausage, peanut butter, jelly, cheese or the like.

Another object is to provide a food product of this character embodying the desired proportion of the two materials and so proportioned structurally as to withstand packing and handling without breakage.

Another important object of the present invention is to provide a novel and advantageous method of making a food product of this character.

Other objects and advantages will become apparent from the following description, taken in connection with the accompanying drawing which illustrates a preferred form of my new product in the various stages of its manufacture, and in which:

Fig. 1 is a perspective view of the food product embodying my invention.

Fig. 2 is a perspective view showing a portion of a potato or other solid food as it is initially cut in the preparation of the product.

Fig. 3 is a side elevational view of a boring machine used in making the product.

Fig. 4 is a side view of a holder used during the cooking operation.

Fig. 5 is a side view of the filling mechanism used in the process.

Fig. 6 is an enlarged sectional view taken along the line 6—6 of Fig. 4.

In the practice of my invention, the raw potatoes, or other vegetable or fruit or solid food substance which is to be used for the outer shell, are washed and cut to form a plurality of elongated hollow shells 10 such as that shown in Fig. 1, each shell having an axial opening or bore 11 formed therein extending from end to end. These raw shells 10 are then French fried by immersion in a suitable cooking fluid such as hot grease, until thoroughly cooked, after which they are withdrawn, and preferably while still warm, the central bore 11 is filled with a plastic food 12 such as peanut butter or any of the other foods above mentioned. The plastic filler 12, being in intimate contact with the cooked shell 10, permeates and adds to the flavor of the shell so that the resulting composite food product has a novel and pleasing taste. During the cooking operation, the shells 10 are supported, preferably interiorly, so as to preserve the form of the article.

The finished food product shown in Fig. 1 is so proportioned that the walls of the shell 10 are thin enough to be thoroughly cooked by immersion in hot grease, while the length of the shell is preferably equal to the average length of a potato or other solid food which is to be employed as a shell. With these limitations there must also be considered the strength necessary in the product in order that it may withstand breakage in handling and packing. Hence the product, in its preferred form, is made square in cross section (Fig. 1) with a cylindrical central opening 11, thereby providing strength to resist bending or breaking of the product. By making the shell one-quarter inch square, with a one-eighth inch central bore, it has been found that proper cooking is insured, while the product is sufficiently rugged to enable it to be made in two inch lengths.

In the manufacture of my new food product from potato in the size above described, the potatoes are formed into two inch cubes 15 as shown in Fig. 2, after which each cube is divided into sixty-four elongated prisms 16 of square cross section by any conventional form of cutting means. While held together, the entire group of prisms 16 is placed and clamped in a holder 17 with the ends of the prisms exposed at the open end of the holder. With the holder 17 is associated a slidable drill head 18 carrying a plurality of parallel drills 19 which, in movement of the head 18 toward the holder 17, form the axial bores 11 in the prisms 16, thus producing the shells 10.

The group of shells 10 is then removed from the holder 17 by a carrier 19' which engages and supports the shells individually. The carrier 19' preferably comprises a plate 20 with a plurality of pins 21 projecting therefrom in laterally spaced relation so as to extend through the bores 11 of said shells. As herein shown the spacing of the pins 21 at their fixed ends is slightly greater than the spacing of the bores 11 when the shells are in the holder 17. With this construction, the pins are tapered at one side adjacent their ends, as shown in Fig. 6 at 22 so as to shift the shells laterally outwardly of the holder as the pins pass into the bores 11. The taper of the pins 21 varies according to their position on the carrier plate 20, the outermost row of pins having the greatest taper, whereby to produce a slight spacing of the shells 10 from each other. This spacing of the shells insures proper and individual cooking of the shell 10 when the entire carrier 19 is immersed in hot grease in the manner conventionally employed in French frying potatoes.

After cooking, the shells are stripped from the pins 21 by a shiftable grid 23 which surrounds the pins 21 adjacent to the base plate 20. By alining the pins with the discharge tubes 24 of a filling device 25 the cooked shells 10 may be transferred to the tubes 24 so as to be supported thereby. The shells 10 are then ready for the introduction of the plastic filler 12, and this operation is preferably performed while the shells remain relatively warm so as to insure slight permeation of the shell by the plastic filler.

The filling operation is accomplished by discharging filler 12 from the tubes 24 while withdrawing the tubes from the shells 10. To this end the filling device 25 has a supply cylinder 26 slidable longitudinally on a base 27, the cylinder having the tubes 24 mounted on one end thereof. At its other end the cylinder has a piston 28 actuated by a conventional screw shaft 29 to discharge filler from the tubes 24. Fixed to the base 27 is a grid 30 through which the tubes 24 extend so that the shells 10 are held stationary as the tubes 24 are withdrawn in the filling operation.

The food product herein described has been found, in practice, to possess a striking as well as a pleasing taste, while its form is such that it is attractive to purchasers and the article may be easily handled by such purchasers. The form is also such that the product withstands handling and packing so as to insure against undue loss.

It will be evident that the method disclosed herein for making my new food product insures proper formation of the shells and maintains this form during the process so as to facilitate handling and insure uniformity in the product.

I claim as my invention:

1. A food product comprising a hollow shell formed from a vegetable such as a potato and French fried by exposure of both its inner and outer surfaces to the cooking action of hot grease, and a filler of plastic food in said shell.

2. A food product comprising an elongated one-piece shell formed from a potato so as to be of substantially square cross section with an axial bore therein, said shell being cooked in hot grease, and a filler of plastic food supported and housed within the bore of said shell.

3. The method of making a food product which consists in forming a one-piece elongated shell from a vegetable such as a potato, supporting said shell against deformation while cooking the same in hot grease, and introducing a plastic filler material into said shell after cooking.

4. The metehod of making a food product which consists in forming from a vegetable such as a potato a one-piece elongated shell of square cross section with an axial bore therethrough, introducing a support into said bore, placing said support and the shell carried thereby in hot grease, removing said shell from the support after cooking, and filling said bore with plastic food.

5. The method of making a food product which consists in forming from a vegetable such as a potato a hollow shell having relatively thin side walls defining a relatively narrow central passage, supporting said shell by means extending into said passage, and cooking the shell in hot cooking fluid while the shell is thus supported.

6. The method of making a food product which consists in forming from a vegetable a hollow shell having relatively thin side walls defining a relatively narrow central passage, supporting said shell by means extending into said passage, cooking the shell in hot cooking fluid while the shell is thus supported, and filling said passage with plastic food after cooking of the shell.

7. A food product comprising an elongated French fried shell formed from potato and having an outside transverse dimension of substantially one-fourth inch with a longitudinal opening therethrough substantially one-eighth inch in diameter, and a filler of plastic food housed by said shell.

8. A food product comprising an elongated French fried shell of substantially square cross section formed from a vegetable such as a potato and having a central opening therethrough, the side faces of said shell being substantially one-fourth inch in width, and said opening being substantially one-eighth inch in diameter, and a filling of plastic food housed in said opening.

9. The method of making a food product which consists in forming from a vegetable such as a potato an elongated shell having relatively thin side walls defining a narrow central passage, French frying said shell in hot cooking fluid, and filling said passage with plastic food.

ARTHUR L. KURZ.